US009088468B2

(12) United States Patent
Sundström et al.

(10) Patent No.: US 9,088,468 B2
(45) Date of Patent: Jul. 21, 2015

(54) DOUBLE CONVERSION DUAL-CARRIER RADIO FREQUENCY RECEIVER

(75) Inventors: Lars Sundström, Lund (SE); Magnus Nilsson, Lund (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 665 days.

(21) Appl. No.: 13/354,984

(22) Filed: Jan. 20, 2012

(65) Prior Publication Data

US 2013/0188756 A1    Jul. 25, 2013

(51) Int. Cl.
| | |
|---|---|
| *H04L 25/06* | (2006.01) |
| *H04L 27/06* | (2006.01) |
| *H04L 27/26* | (2006.01) |
| *H04L 5/00* | (2006.01) |
| *H04B 1/00* | (2006.01) |
| *H04B 1/28* | (2006.01) |
| *H04B 1/403* | (2015.01) |

(52) U.S. Cl.
CPC ............ *H04L 27/2649* (2013.01); *H04L 5/001* (2013.01); *H04B 1/0071* (2013.01); *H04B 1/0075* (2013.01); *H04B 1/28* (2013.01); *H04B 1/403* (2013.01)

(58) Field of Classification Search
CPC .. H04L 27/2649; H04L 5/001; H04B 1/0071; H04B 1/28; H04B 1/0075; H04B 1/403
IPC ................ H04L 27/2649, 5/001; H04B 1/0071, H04B 27/2649, 5/001, 1/403
See application file for complete search history.

(56) References Cited

U.S. PATENT DOCUMENTS

| | | | |
|---|---|---|---|
| 5,038,404 | A | 8/1991 | Marz |
| 6,393,299 | B1 | 5/2002 | Mizumoto et al. |
| 7,310,023 | B2 | 12/2007 | Cha et al. |
| 7,928,807 | B2 | 4/2011 | Mishra |
| 2002/0127982 | A1* | 9/2002 | Haapoja et al. ............. 455/130 |
| 2003/0007450 | A1* | 1/2003 | Ohtaki ..................... 370/208 |
| 2005/0237924 | A1* | 10/2005 | Weste et al. ............... 370/208 |
| 2006/0183455 | A1* | 8/2006 | Cha et al. ................. 455/323 |
| 2009/0075613 | A1* | 3/2009 | Safarian et al. ........... 455/232.1 |

FOREIGN PATENT DOCUMENTS

| | | |
|---|---|---|
| EP | 1241779 A2 | 9/2002 |
| GB | 2258776 A | 2/1993 |
| WO | 2011138697 A1 | 11/2011 |

OTHER PUBLICATIONS

Larsson, P., et al., "Mult-User ARQ", IEEE VTC, Spring 2006, pp. 2052-2057.
Ali, M., et al., "Completely Stale Transmitter Channel State Information is Still Very Useful", Allerton Conference, 2010, pp. 1-19, Retrieved from http://arxiv.org/abs/1010.1499.

* cited by examiner

*Primary Examiner* — Shuwang Liu
*Assistant Examiner* — Ross Varndell
(74) *Attorney, Agent, or Firm* — Coats & Bennett, P.L.L.C.

(57) ABSTRACT

In a dual-carrier, double-conversion Orthogonal Frequency Division Multiplexing (OFDM) receiver a frequency synthesizer generates a first local oscillator signal for the first down-conversions stage of the receiver. A frequency divider is used to derive a second local oscillator signal from the first local oscillator signal, thus eliminating the need for a separate frequency synthesizer for the second down-conversion stage. A controller determines the frequency of the first local oscillator signal and a divisor M to align subcarrier grids for said first and second baseband signals with DC.

14 Claims, 8 Drawing Sheets

DOUBLE CONVERSION DUAL-CARRIER RADIO FREQUENCY RECEIVER

BACKGROUND

The present invention relates generally to double conversion receivers, and, more particularly, to a dual-carrier, double conversion receiver for a multi-carrier communication system.

Conventional wireless communication systems transmit data to users on a single carrier. To meet the demand for wireless high-speed data services, carrier aggregation is being introduced in Long Term Evolution Advanced (LTE-A) networks. Carrier aggregation supports wider transmission bandwidths by allowing simultaneous transmission on multiple carriers. Multicarrier systems, such as LTE-A, offer advantages over conventional single carrier systems such as higher data rates, reduced latency, and improved support for Quality of Service (QoS).

A number of multi-carrier receiver architectures are possible. One solution is to provide separate receiver paths in the analog front-end. For adjacent or sufficiently close carriers, a first local oscillator can be used to down-convert both carrier signals from radio frequency to an intermediate frequency, and a second local oscillator can be used to down-convert the intermediate frequency signal to baseband. However, the use of two receiver paths in the analog front-end requires duplication of components, which increases cost, power consumption, and space requirements.

A single receiver front-end can be used to receive both carriers. A first local oscillator may be used to down-convert both carrier signals from radio frequency to an intermediate frequency and a second local oscillator to down-convert the intermediate frequency signals to baseband. The carrier signals are separated during the down-conversion to baseband. While this approach reduces the number of components, two local oscillators are still required: one for the down-conversion to the intermediate frequency and one for the down-conversion to baseband.

Despite advances in radio receiver architecture, there remains a need for further reduction in radio frequency components to meet increasing consumer demand for compact mobile devices with long battery life.

SUMMARY

Embodiments of the present invention relate to a dual-carrier, double conversion radio frequency receiver for an Orthogonal Frequency Division Multiplexing (OFDM) system. The dual-carrier receiver includes a single frequency synthesizer configured to generate a first local oscillator signal for the first down-conversion stage of the receiver. A frequency divider is used to derive a second local oscillator signal from the first local oscillator signal, thus eliminating the need for a separate frequency synthesizer for the second down-conversion stage.

When the frequency divider is constrained to perform integer division, the down-conversion may not exactly align both carriers with DC. The resulting frequency translation error may result in severe interference as will be described in more detail below. In order to mitigate the effects of the frequency translation error, the carriers may be shifted relative to DC so long as the subcarrier grid is aligned with DC within tolerances. For example, in a OFDM system with a subcarrier spacing of 15 kHz, the carriers may be shifted relative to DC by an amount equal to N times the subcarrier spacing, e.g. 20×15 kHz=300 kHz. Alignment of the subcarrier grid with DC is possible through careful selection of the first oscillator signal frequency and a divisor M. By aligning the carriers with the subcarrier grid, a final frequency translation can be made in the digital domain before FFT operations without significantly affecting performance.

According to a first aspect of the invention, a dual carrier receiver is provided for an Orthogonal Frequency Division Multiplexing (OFDM) system. The dual-carrier receiver comprises a first mixer configured to down-convert a received dual-carrier signal having first and second OFDM carriers to generate an intermediate frequency dual-carrier signal; a frequency synthesizer configured to generate a first local oscillator frequency for the first mixer, said first local oscillator frequency being between first and second carriers; a second mixer configured to separate the first and second carriers and to down-convert said first and second carriers to generate first and second baseband signals; a frequency divider coupled to said frequency synthesizer and configured to divide the first local oscillator frequency by a divisor M to generate a second local oscillator frequency for said second mixer; and a controller configured to select the first local oscillator frequency and the divisor M to align subcarrier grids for said first and second baseband signals with DC.

In some embodiments, the dual-carrier receiver may further comprise a controller configured to select an integer divisor M for the frequency divider.

In some embodiments, the dual-carrier receiver may further comprise a controller configured to select the first local oscillator frequency to reduce the effects of frequency translation errors resulting from the division of the first local oscillator frequency by an integer divisor.

In some embodiments, the dual-carrier receiver may further comprise a controller configured to select the first local oscillator frequency as a function of the integer divisor M.

In some embodiments, the dual-carrier receiver may further comprise a controller configured to select the first local oscillator frequency as a function of a frequency spacing of the subcarrier grid and the divisor.

In some embodiments, the dual-carrier receiver may further comprise a controller configured to select the first local oscillator frequency by determining an initial local oscillator frequency between the first and second carriers; and determining a frequency adjustment that when added to said initial local oscillator frequency aligns subcarrier grids for said first and second baseband signals with DC.

In some embodiments, the dual-carrier receiver may further comprise a controller configured to determine the frequency adjustment by computing, as a function of a first parameter and the subcarrier spacing, a first frequency translation to align the subcarrier grid for the first baseband signal to DC; computing, as a function of a second parameter and the subcarrier spacing, a second frequency translation to align the subcarrier grid for the second baseband signal to DC; selecting the first and second parameters to minimize a difference between actual and desired frequency translations for the first and second carriers; and computing the frequency adjustment as a function of one or both of the first and second parameters.

In some embodiments, the dual-carrier receiver may further comprise a controller configured to select integer values for the first and second parameters.

In some embodiments, the dual-carrier receiver may further comprise a controller configured to select the first local oscillator frequency and divisor M such at least one of the first and the second baseband signals has a nonzero center frequency.

According to a second aspect of the present invention, a wireless communications device is provided comprising a dual-carrier receiver as described above.

According to a third aspect of the invention, a method is provided for down-converting a dual-carrier Orthogonal Frequency Division Multiplexing (OFDM) signal comprising first and second carriers to baseband. The method comprises generating a first local oscillator frequency between first and second carriers; down-converting the received dual-carrier signal to generate an intermediate frequency dual-carrier signal by mixing the received dual-carrier signal with the first local oscillator frequency; generating a second local oscillator frequency from the first local oscillator frequency by dividing the first local oscillator frequency by a divisor M; separating the first and second carriers; down-converting the first and second carriers to generate first and second baseband signals by mixing the first and second carriers with the second local oscillator frequency; and selecting the first local oscillator frequency and the divisor M to align subcarrier grids for said first and second baseband signals with DC.

In some embodiments, selecting the first local oscillator frequency and divisor M may further comprise selecting an integer divisor M for the frequency divider.

In some embodiments, selecting the first local oscillator frequency and divisor M further comprises selecting the first local oscillator frequency to reduce the effects of frequency translation errors resulting from the division of the first local oscillator frequency by the integer divisor.

In some embodiments, selecting the first local oscillator frequency and divisor M may further comprise selecting the first local oscillator frequency as a function of the integer divisor M.

In some embodiments, selecting the first local oscillator frequency and divisor M may further comprise selecting the first local oscillator frequency as a function of the subcarrier spacing and the divisor M.

In some embodiments, selecting the first local oscillator frequency further may comprise determining an initial local oscillator frequency between the first and second carriers; and determining a frequency adjustment that when added to said initial local oscillator frequency aligns subcarrier grids for said first and second baseband signals with DC.

In some embodiments, determining a frequency adjustment may comprise computing, as a function of a first parameter and the subcarrier spacing, a first frequency translation to align the subcarrier grid of the first baseband signal to DC; computing, as a function of a second parameter and the subcarrier spacing, a second frequency translation to align the subcarrier grid of the second baseband signal to DC; selecting the first and second parameters to minimize a difference between the actual and desired frequency translations for the first and second carriers; and computing the frequency adjustment as a function of one or both of the first and second parameters.

In some embodiments, the first and second parameters may comprise integer values.

In some embodiments, selecting the first local oscillator frequency and the divisor M may comprise selecting the first local oscillator frequency and the divisor M such that at least one of the first and the second baseband signals has a nonzero center frequency.

In some embodiments, the method may be implemented by a wireless communication device.

The methods and apparatus described herein enable the reduction of components in the front-end of the receiver. The reduction in the component count results in lower space requirements, lower costs, and lower power consumption.

DETAILED DESCRIPTION

Figure 1:
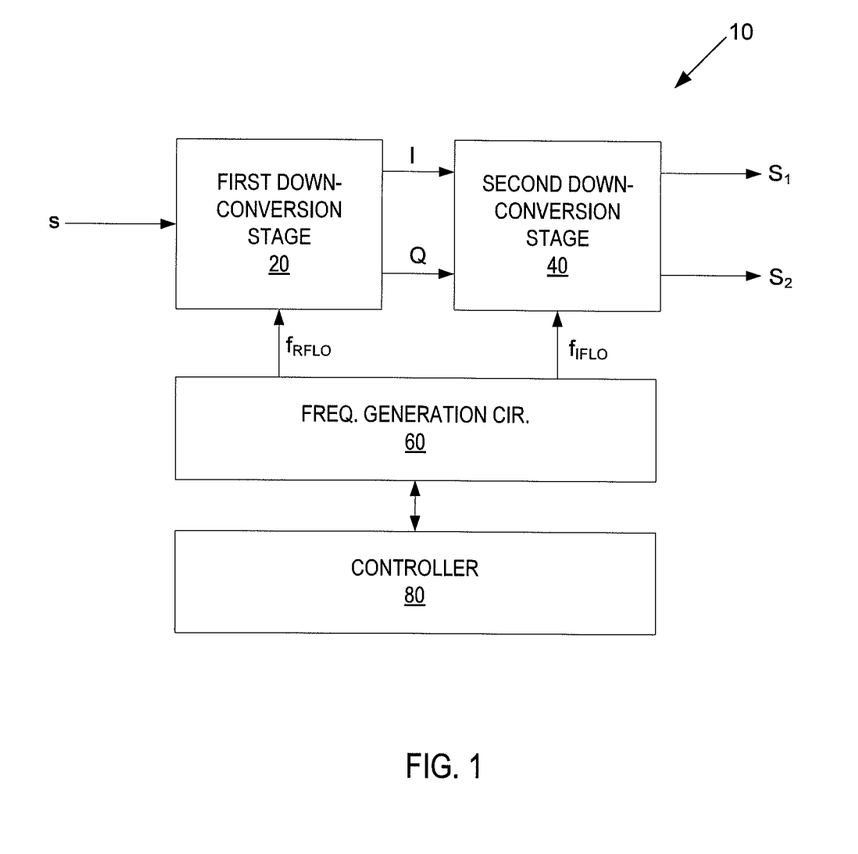
FIG. 1 illustrates a dual-carrier double conversion radio frequency receiver according to an exemplary embodiment having first and second down-conversion stages.

Referring to FIG. 1, an exemplary dual-carrier, double conversion radio frequency receiver 10 ("hereinafter "dual-carrier receiver 10") according to one embodiment of the invention is shown. The dual-carrier receiver 10 comprises a first down-conversion stage 20, a second down-conversion stage 40, a frequency generation circuit 60, and a controller 80. The first down-conversion stage 20 down-converts a received dual-carrier signal to an intermediate frequency. The second down-conversion stage 40 down-converts the intermediate frequency signal to baseband and separates the carriers. The frequency generation circuit 60 generates the local oscillator (LO) signals for the down-conversion in both the first and second down-conversion stages 40, 60 respectively. The controller 80 controls the frequency generation circuit 60 as hereinafter described in order to align the subcarrier grids of first and second baseband signals with DC. For example, the controller 80 in a receiver 10 adapted for use in an OFDM system receiver operates to align the subcarrier grids of the baseband signals after down-conversion with DC (0 Hz).

Figure 2:
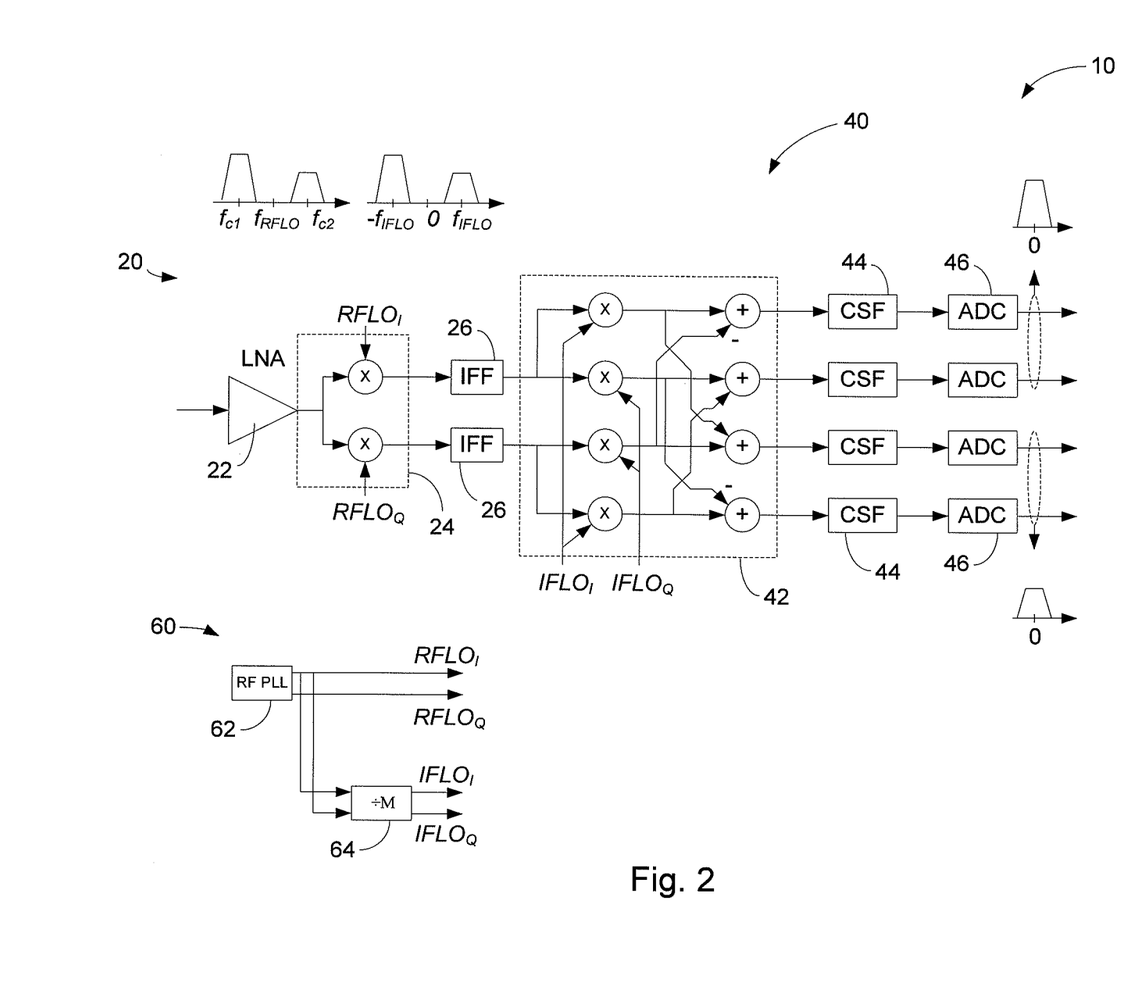
FIG. 2 illustrates a dual-carrier, double conversion receiver with a single complex mixer in the second down-conversion stage for both carriers.

FIG. 2 illustrates the first and second down-conversion stages 20 and 40 in more detail. The first down-conversion stage 20 comprises a low noise amplifier (LNA) 22, quadrature demodulator 24, and intermediate frequency filters (IFFs) 26. The LNA 22 boosts the received dual-carrier signal obtained from the antenna or antennas. The boosted dual-carrier signal is then input to the quadrature demodulator 24. The quadrature demodulator 24 functions as a first down-converter. The quadrature modulator 24 combines the received dual-carrier with local oscillator signals $RFLO_I$ and $RFLO_Q$ provided by the frequency generation circuit 60 to generate a complex intermediate frequency (IF) signal having two component signals: the real component signal (I) and the imaginary component signal (Q). The IFFs 26 filter respective component signals to reduce levels of blocking signals before further processing to alleviate the dynamic range requirements for the downstream components. The complex IF signal is then input to the second down-conversion stage 40.

The second down-conversion stage 40 comprises a complex mixer 42, channel select filters (CSFs) 44, and analog-to-digital converters 46. In this embodiment, a single complex mixer 42 functions as a second down-converter for both carriers. The complex mixer 42 down-converts the intermediate frequency signal to baseband and separates the carriers.

The frequency generation circuit 60 provides the complex mixer 42 with local oscillator signals $IFLO_I$ and $IFLO_Q$ to drive the down-conversion. The CSFs 44 filter the carriers to select the desired signals and to reject or attenuate signals outside the channel of interest. The analog carriers are then converted to digital form by the ADCs 46 and are input to a baseband processing unit.

The frequency generation circuit 60 in the first embodiment comprises a frequency synthesizer 62, such as a phase-locked loop (PLL), to generate the RFLO signal for the first down-conversion stage 20. The frequency generation circuit 60 further includes a frequency divider 64 to generate the IFLO signal for the second down-conversion stage. In the embodiment of FIG. 2, a single IFLO signal is used for down-conversion of both carriers to baseband.

The controller 80 (FIG. 1) may comprise one or more processors, hardware, firmware, or a combination thereof. In the context of the present invention, the controller 80 is configured to select the frequency $f_{RFLO}$ of the RFLO signal to the first down-conversion stage 20, and the divider M 64 is configured to generate the IFLO signal for the second down-conversion stage 40.

Figure 3:
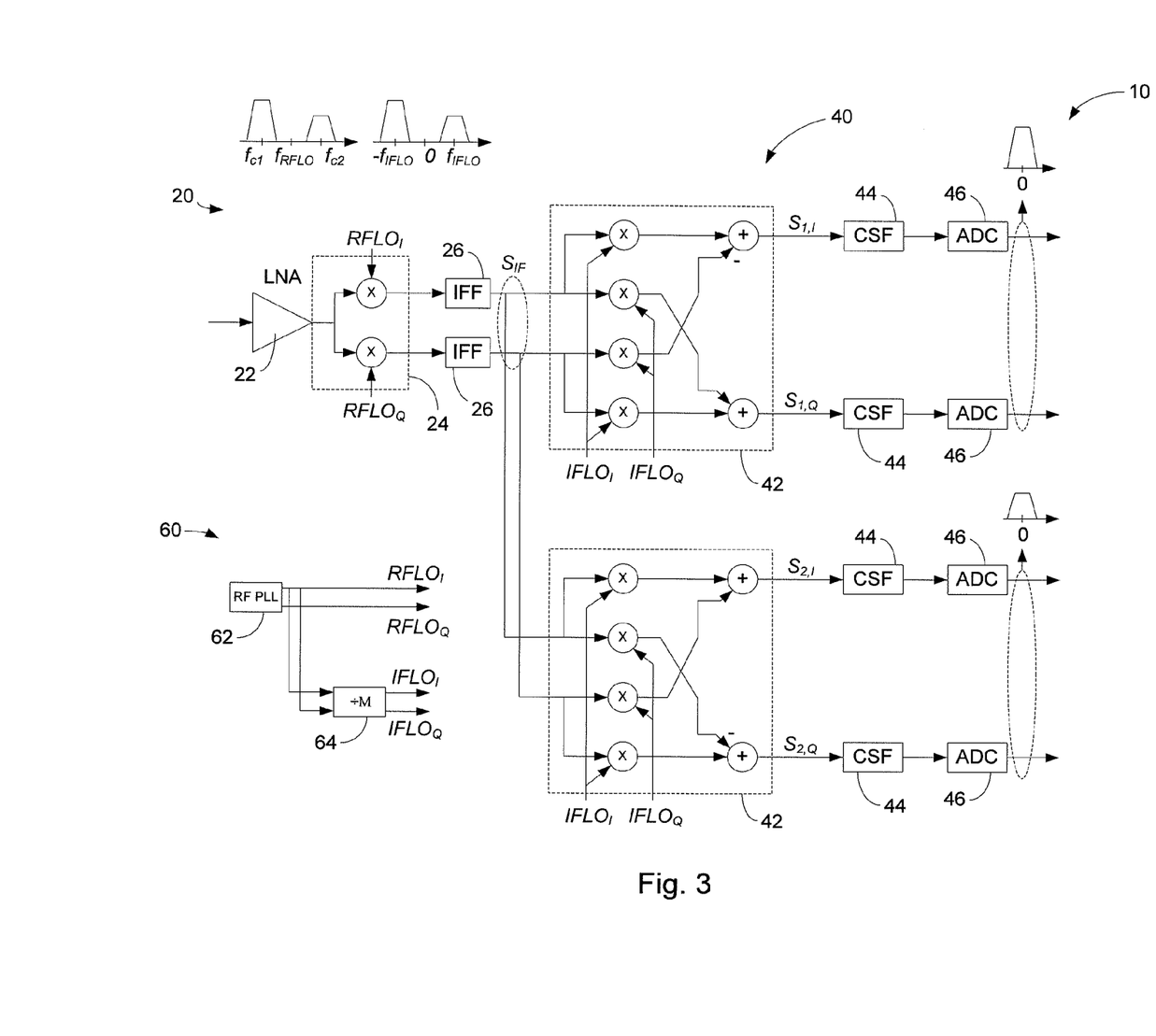
FIG. 3 illustrates a dual-carrier, double conversion receiver with a separate complex mixer in the second down-conversion stage for each carrier.

FIG. 3 illustrates a second embodiment of the dual-carrier receiver 10 using two complex mixers 42 in the second down-conversion stage 40. The second embodiment is similar to the first embodiment. Therefore, similar reference numerals are used to indicate similar components.

The first down-conversion stage 20 in the second embodiment of the dual-carrier receiver 10 is the same as previously described. The second down-conversion stage 40, instead of using a single complex mixer 42 comprises separate complex mixers 42 for each carrier. The complex mixers 42 function as the second down-converters for respective carriers. The frequency generation circuit 60 and controller 80 in the second embodiment of the dual-carrier receiver 10 are the same as previously described.

In the dual-carrier receivers 10 described above, the received signal comprises two carriers that are proximate in frequency. The center frequencies of the two carriers are denoted $f_{c1}$ and $f_{c2}$ respectively (see top left of FIG. 3). The frequency $f_{RFLO}$ of the local oscillator signal RFLO driving the quadrature modulator 24 is set between the center frequencies $f_{c1}$ and $f_{c2}$ of the carriers, i.e. $f_{c1} < f_{RFLO} < f_{c2}$. In prior art dual-carrier receivers, $f_{RFLO}$ is equal to the mid-point of the center frequencies $f_{c1}$ and $f_{c2}$. The complex output of the quadrature modulator 24 makes it possible to distinguish the two carriers, which are on opposite sides of DC. The second down-conversion stage 40 separates the two carriers while also down-converting them to baseband. This down-conversion requires a second local oscillator signal IFLO with a frequency $f_{IFLO}$ equal to the intermediate frequency.

The complex intermediate frequency signal at the input to the second down-conversion stage may be represented by:

$$s_{IF} = m_1 \cdot e^{j2\pi(f_{c1} - f_{RF,LO})} + m_2 \cdot e^{j2\pi(f_{c2} - f_{RF,LO})} = m_1 \cdot e^{-j2\pi f_{IF,LO}} + m_2 \cdot e^{j2\pi f_{IF,LO}}, \quad (0.1)$$

where $m_1$ and $m_2$ represent the complex-valued modulation for the first and second carriers, respectively. The purpose of the complex mixer is to multiply this input signal by two phasors, $e^{-j2\pi f_{IF,LO}}$ and $e^{j2\pi f_{IF,LO}}$, yielding two complex-valued baseband signals as follows:

$$s_1 = e^{j2\pi f_{IF,LO}}(m_1 \cdot e^{-j2\pi f_{IF,LO}} + m_2 \cdot e^{j2\pi f_{IF,LO}}) = m_1 + m_2 \cdot e^{j4\pi f_{IF,LO}} \quad (0.2)$$

$$s_2 = e^{-j2\pi f_{IF,LO}}(m_1 \cdot e^{-j2\pi f_{IF,LO}} + m_2 \cdot e^{j2\pi f_{IF,LO}}) = m_1 \cdot e^{-j4\pi f_{IF,LO}} + m_2 \quad (0.3)$$

The components at double the IFLO frequency are removed by the CSFs 46. Thus, the absolute value of the effective translation frequencies $f_{ft1}$ and $f_{ft2}$ for the first and second carriers ($s_1$ and $s_2$) respectively are given by:

$$f_{ft1} = f_{RFLO} - f_{IFLO} \quad (0.4)$$

$$f_{ft2} = f_{RFLO} + f_{IFLO} \quad (0.5)$$

In prior art dual-carrier receivers, the two LO frequencies are generated independently of each other, which means that two LO synthesizers are required. The requirement of two LO synthesizers is a disadvantage in terms of increased silicon area and power consumption, as well as increased risk of spurious noise generation due to coupling effects between the two LO synthesizers.

Embodiments of the present invention use only a single LO synthesizer to generate the RFLO signal for the first down-conversion stage 20. The IFLO signal for the second down-conversion stage 40 is derived from the RFLO signal. Thus, the generation of the IFLO signal and the RFLO signal can be accomplished by using a single LO synthesizer. For example, the IFLO signal may be derived using a conventional frequency divider represented by:

$$f_{IFLO} = f_{RFLO}/M \quad (0.6)$$

where M is an integer. The effective translation frequencies $f_{ft1}$ and $f_{ft2}$ are given by:

$$f_{ft1} = f_{RF,LO} - f_{IF,LO} = f_{RF,LO} - f_{RF,LO}/M = f_{RF,LO}(1 - 1/M) \quad (0.7)$$

$$f_{ft2} = f_{RF,LO} + f_{IF,LO} = f_{RF,LO} + f_{RF,LO}/M = f_{RF,LO}(1 + 1/M) \quad (0.8)$$

Ideally, it would be desirable that the effective translation frequencies $f_{ft1}$ and $f_{ft2}$ coincide with the center frequencies $f_{c1}$ and $f_{c2}$ of the carriers to down-convert the carriers to baseband (at DC). However, due to restrictions on the divider ratio M, there will be a difference between the effective translation frequency and the carrier frequency, shown as a frequency translation error in Equations (0.9) and (0.10 below).

$$\Delta f_1 = f_{ft1} - f_{c1} \quad (0.9)$$

$$\Delta f_2 = f_{ft2} - f_{c2} \quad (0.10)$$

Thus, there is a difference between the effective frequency translation and the desired frequency translation resulting from the division of the first LO signal by an integer.

To illustrate the reason for these frequency translation errors, consider a case where the same IFLO signal (unsigned) is used to down-convert both carriers as shown in FIGS. 2 and 3. In order for the baseband signals to both be centered at DC, the frequency $f_{RFLO}$ of the RFLO signal should be set at exactly the mid-point of the center frequencies $f_{c1}$ and $f_{c2}$. In this case, the frequency $f_{RFLO}$ of the RFLO signal is given by:

$$f_{RFLO} = (f_{c2} + f_{c1})/2 \quad (0.11)$$

The frequency $f_{IFLO}$ to properly translate the carriers to baseband, then becomes:

$$f_{IFLO} = (f_{c2} - f_{c1})/2 \quad (0.12)$$

However, in cases where $f_{IFLO}$ is a result of the division of $f_{RFLO}$ by an integer M, it will not be possible to properly frequency translate both carriers unless $$f_{RFLO}/M = (f_{c2} - f_{c1})/2 \quad (0.13)$$

Finding an integer value of M that satisfies Eq. (0.13) will not be possible in most instances, but would require specific selection of the center frequencies $f_{c1}$ and $f_{c2}$.

In embodiments of the present invention, a value for M is selected from the set of possible values that leads to translation frequencies $f_{f1}$ and $f_{f2}$ being close to the desired values. A final small frequency-translation can then be made in the digital domain.

As an example, consider two carriers having center frequencies $f_{c1}$=2630 MHz and $f_{c2}$=2680 MHz. In this case, the desired frequency $f_{RFLO}$ given by Eq. (0.11) is 2655 MHz and the desired frequency $f_{IFLO}$ given by (0.12) is 25 MHz. Dividing $f_{IFLO}$ into $f_{RFLO}$ gives a fractional M equal to 106.2. If M is set equal to 106, the value of $f_{IFLO}$ given by (0.6) becomes 25.047 MHz, which results in a translation error of 47 kHz from the desired values. In this example, the translation frequency $f_{f1}$ is equal to 2680.047 MHz and the translation frequency $f_{f2}$ is equal to 2629.953 MHz.

Due to the non-ideal behavior of the analog circuits, even a small frequency translation error resulting from the down-conversion can present a problem. The frequency translation error leads to increasingly high levels of interference as the frequency translation error increases. When the baseband signals $s_1$ and $s_2$ span over DC, there is no simple means for separating the signals from the DC component without affecting the signals themselves. This problem is particularly challenging for OFDM systems, such as Long Term Evolution (LTE) systems.

In an OFDM system, a dual-carrier signal comprises two separate OFDM signals modulated onto two different component carriers, which are centered on first and second frequencies respectively. Each OFDM signal comprises a plurality of subcarriers that are equally spaced in the frequency domain. In LTE, the spacing of the subcarriers is 15 kHz. The received signal is transformed from the time domain to the frequency domain by a Fast Fourier Transform (FFT) operation. Before the FFT operation, the subcarrier grid should be aligned with DC to avoid inter-carrier interference (ICI).

Figure 4:
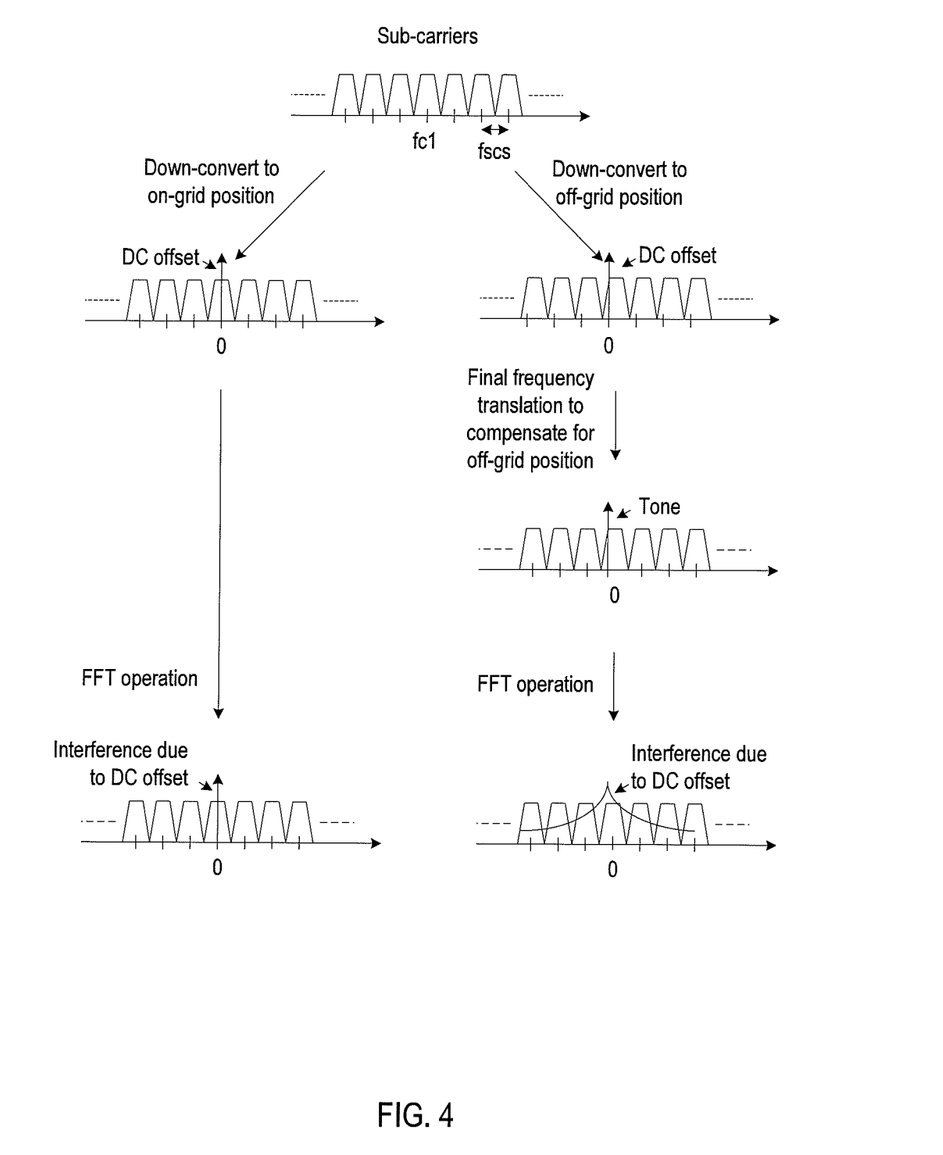
FIG. 4 illustrates the effects of a DC offset in a down-converted signal.

FIG. 4 illustrates the problem caused by a frequency translation error following down-conversion. As seen in the left side of FIG. 4, when the analog circuits contribute a DC offset and the frequency-translation positions one of the subcarriers exactly on DC (0 Hz), the DC offset will interfere with the subcarrier located at DC only and the transmission is typically robust enough to handle the loss of a single subcarrier. However, when the down-converted carriers are not aligned with DC before entering the digital domain, as shown on the right side of FIG. 4, a final frequency translation is performed in the digital domain before the FFT operation. Unfortunately, this final frequency translation will result in an undesired tone that is not aligned with the subcarrier grid. The presence of the undesired tone can lead to a severe interference for several subcarriers after the FFT operation.

The detrimental effects of the resulting frequency translation errors can be alleviated provided that the subcarrier grids of the baseband signals are aligned with DC. As long as the subcarrier grid aligns with DC, a final frequency translation can be made in the digital domain before FFT operations without significantly affecting performance. Accordingly, in embodiments of the invention, the first local oscillator frequency $f_{RFLO}$ is shifted from the mid-point of the carrier frequencies by an amount $\Delta f_{RFLO}$ in order to ensure that the subcarrier grids of the down-converted carriers align with DC (0 Hz). The frequency shift $\Delta f_{RFLO}$ reduces the effects of frequency translation errors resulting from the division of the first local oscillator frequency by the integer divisor.

The frequency adjustments $\Delta f_{RFLO}$ needed to align the subcarrier grids for the first and second baseband signals with DC are given by:

$$f_{o1} = \Delta f_{RFLO}(1-1/M) \qquad (0.14)$$

$$f_{o2} = \Delta f_{RFLO}(1+1/M) \qquad (0.15)$$

where $f_{o1}$ and $f_{o2}$ are the frequency offsets between the subcarrier grids for respective carriers and DC. To illustrate, assume M=106 with an offset of 7.5 kHz for both carriers. The frequency adjustment $\Delta f_{RFLO}$ required to properly translate $f_{c1}$ to DC is 7.571 kHz. The frequency adjustment $\Delta f_{RFLO}$ required to properly translate $f_{c2}$ to DC is 7.430 kHz.

Frequency adjustments greater than the subcarrier spacing, denoted $f_{scs}$, are allowed in order to align both subcarrier grids to DC To account for frequency adjustments greater than $f_{scs}$, Eqs. (0.14) and (0.15) can be modified as shown below:

$$f_{RFLO}(1-1/M) = f_{o1} + N_1 \cdot f_{scs} \qquad (0.16)$$

$$f_{RFLO}(1+1/M) = f_{o2} + N_2 \cdot f_{scs} \qquad (0.17)$$

where $f_{o1}$ and $f_{o2}$ are the frequency offsets associated with the carriers, and the parameters $N_1$ and $N_2$ are shifting parameters that shift the down-converted baseband signals with respect to DC in order to align the subcarrier grids of the baseband signals with DC. The parameters $N_1$ and $N_2$ have integer values, and $N_1 \le N_2$. When the requirement of aligning the center frequencies of the carriers to DC is removed, the terms $N_1 \cdot f_{scs}$ and $N_2 \cdot f_{scs}$ in Eqs. (0.16) and (0.17) provide the necessary freedom to more closely align the carriers to the subcarrier grid after frequency translation. It should be noted that in the usual case, the value of $N_2$ will typically be one greater than $N_1$ because the ratio (1−1/M)/(1+1/M) will be close but not equal to unity when M is large. In most cases, the frequency offsets $f_{o1}$ and $f_{o2}$ are the same, e.g., all LTE carriers should be aligned to the same grid. By allowing them to be different, the more general case can be considered where the two carriers are not aligned, e.g. in the event of multi-RAT reception.

Eqs. (0.16) and (0.17) can be applied to find the smallest frequency adjustment $\Delta f_{RFLO}$ that will align the carriers to the subcarrier grid. Solving Eqs. (0.16) and (0.17) for $\Delta f_{RFLO}$ and setting them equal, yields the following equality:

$$\frac{1-1/M}{1+1/M} = \frac{M-1}{M+1} = \frac{f_{o1}/f_{scs} + N_1}{f_{o2f}/f_{scs} + N_2} \qquad (0.18)$$

The quantities in Eq. (0.18) are known except for $N_1$ and $N_2$. Given that $N_2 = N_1 + 1$, it is a relatively simple task to find the pair $(N_1, N_2)$ that satisfies Eq. (0.18). Given $N_1$ and $N_2$ that satisfy Eq. (0.18), $\Delta f_{RFLO}$ can be computed according to either Eq. (0.16) or Eq. (0.17). The frequency $f_{RFLO}$ for the first down-conversion stage 20 can then be computed according to:

$$f_{RFLO} = (f_{c2} \pm f_{c1})/2 + \Delta f_{RFLO} \qquad (0.19)$$

A frequency adjustment $\Delta f_{RFLO}$ that is too large may cause some of the subcarriers to be moved outside the bandwidth of the receiver after the second frequency translation such that the CSFs 44 will attenuate these subcarriers. Therefore, a limit may be imposed on how far the translated signal may be shifted from DC. For example, the values of $N_1$ and $N_2$ may be limited to be less than 50. When a limit is imposed on the values of $N_1$ and $N_2$, it may not be possible to find a pair ($N_1,N_2$) that satisfies Eq. (0.18) exactly. In this case, the pair ($N_1,N_2$) that results in the smallest frequency offset is selected.

Returning to the example given above, where $f_{c1}$=2630 MHz and $f_{c2}$=2680 MHz and M equals 106, and assuming an initial frequency offset of 7.5 kHz for both carriers, Eq. (0.18) yields the following equality:

$$\frac{105}{107} = \frac{0.5 + N_1}{0.5 + N_2} \quad (0.20)$$

A brief examination will show that the pair (52,53) satisfies the equality given in Eq. (0.20). Inserting $N_1$ into Eq. (0.14) or $N_2$ into Eq. (0.15) yields $\Delta f$ equal to 795 kHz. Then inserting this value into Eq. (0.19) yields $f_{RFLO}$ equal to 2655.795 MHz.

An arbitrary setup of parameters typically will not lead to an exact solution. Furthermore, as noted above, a maximum allowed shift may be defined, which puts a cap $N_{MAX}$ on $N_1$ and $N_2$. In such cases, Eq. (0.18) may be solved for $N_2$ for all allowed values of $N_1$ (or vice versa). The $N_1$ value giving no or the smallest fractional error on $N_2$ may then constitute a solution.

To illustrate the effect of a cap, consider the example above with a frequency offset $f_o=f_{o1}=f_{o2}$ of 2 kHz for both carriers and a cap $N_{MAX}$=50. In this example, the degenerated solution $N_1=N_2=0$ provides the lowest error. Inserting these values into Eq. (0.16) and Eq. (0.17) yields $\Delta f_{c1}$=2.019 kHz and $\Delta f_{c2}$=1.981 kHz. In this case, the remaining frequency translation error is spread between the two carriers by selecting $\Delta f$=2.0 kHz, which lead to a frequency translation error of 19 Hz on both carriers.

As a further example, consider the case where $f_{c1}$=2630 MHz, $f_{c2}$=2680 MHz, M equals 60, and $f_o=f_{o1}=f_{o2}$=5 kHz, with a cap $N_{MAX}$=50. In this case, the pair (29, 30) yields the best solution for Eq. (0.18). Inserting these values into Eq. (0.16) and Eq. (0.17) yields $\Delta f_{RFLO,c1}$=447.457 kHz and $\Delta f_{RFLO,c2}$=447.540 kHz respectively. In this example, the difference between $\Delta f_{RFLO,c1}$ and $\Delta f_{RFLO,c2}$ is 83 Hz. Using the average value of 447.499 kHz for $\Delta f_{RFLO}$ in Eq. (0.19) leads to a total frequency adjustment of 455.083 kHz for the first carrier and 440.163 kHz for the second carrier. Combined with the initial 5 kHz offset, a residual frequency translation error of only 83 Hz and 163 Hz, respectively, remains.

A further optimization may be utilized to spread out the remaining frequency translation error over the two carriers. As a reference, the leakage from a DC component located at a distance $f_{off}$ from subcarrier n will leak into the adjacent subcarrier n+1 by an amount equal to sin c(($f_{scs}-f_{off})/f_{scs}$). For an error $f_e$ of 163 Hz in the above example, the amount of the leakage will be −39 dBc. For comparison, a DC component located in the middle of two subcarriers correspondingly will leak by an amount of −4 dBc.

Figure 5:
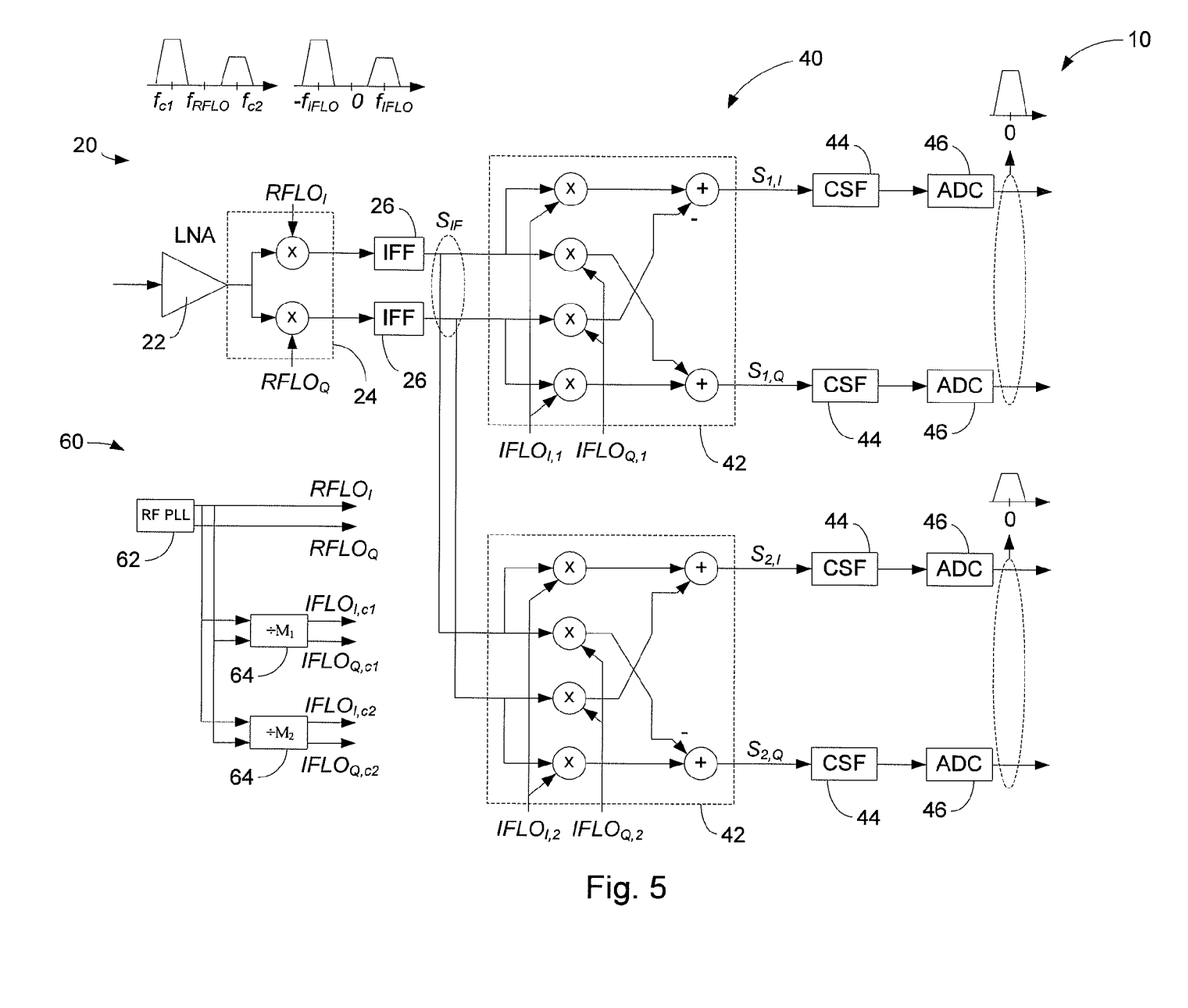
FIG. 5 illustrates a dual-carrier, double conversion receiver with a separate mixer in the second down-conversion stage for each carrier.

FIG. 5 illustrates a second embodiment of the dual-carrier receiver 10 using two complex mixers 42 in the second down-conversion stage 40. The second embodiment is similar to the first embodiment. Therefore, similar reference numerals are used to indicate similar components.

The first down-conversion stage 20 in the second embodiment of the dual-carrier receiver 10 is the same as previously described. The principal difference is that the second down-conversion stage 40 comprises separate complex mixers 42 for each carrier, rather than a single complex mixer 42. The use of separate mixers 42 for each carrier allows different IFLO signals, denoted $f_{IFLO,c1}$ and $f_{IFLO,c2}$ to be used for the down-conversion of different carriers.

The frequency generation circuit 60 in the second embodiment comprises a PLL 62 as previously described to generate the RFLO signal for the first down-conversion stage 20. In this embodiment, two frequency dividers 64 are provided to generate the IFLO signals for the second down-conversion stage 40. The controller 80 in the second embodiment is configured to select the frequency $f_{RFLO}$ of the RFLO signal to the first down-conversion stage 20 and the dividers $M_1$ and $M_2$ to generate the IFLO signals for the second down-conversion stage 40.

The ability to select different divisors $M_1$ and $M_2$ for the two carriers provides another degree of freedom to further reduce the required frequency adjustment $\Delta f_{RFLO}$ without introducing another local oscillator or frequency synthesizer. When $M_1$ and $M_2$ are selected separately, the translation frequencies $f_{ft1}$ and $f_{ft2}$ for the first and second carriers are given by:

$$f_{ft1}=f_{RFLO}-f_{RFLO}/M_1=f_{RFLO}(1-1/M_1) \quad (0.21)$$

and $$f_{ft2}=f_{RFLO}-f_{RFLO}/M_2=f_{RFLO}(1-1/M_2) \quad (0.22)$$

Also, the equality given by Eq. (0.18) can be generalized as:

$$\frac{1-1/M_1}{1+1/M_2} = \frac{f_{o1}/f_{scs}+N_1}{f_{o2}/f_{scs}+N_2} \quad (0.23)$$

In the event that dual carrier reception is carried out with carriers having different bandwidths and/or over multiple Radio Access Technologies (RATs), different conditions may apply to the different carriers, e.g., in terms of required frequency accuracy, subcarrier spacing etc., which may provide additional degrees of freedom for finding the optimal setting of LO parameters.

The present invention addresses a disadvantage with double conversion receivers, namely the need for at least two LO signals having different frequencies. For OFDM-based communication standards such as LTE, embodiments of the present invention allow derivation of the second LO signal from the first LO signal by proper selection of the frequency $f_{RFLO}$ of the first LO. In the event that the bandwidths of the two carriers differs, the allowed maximum difference between carrier frequency and the effective translation frequency may depend on the bandwidth such as a carrier with smaller bandwidth will allow for a smaller difference and a carrier with a larger bandwidth will allow for a larger difference.

Figure 6:
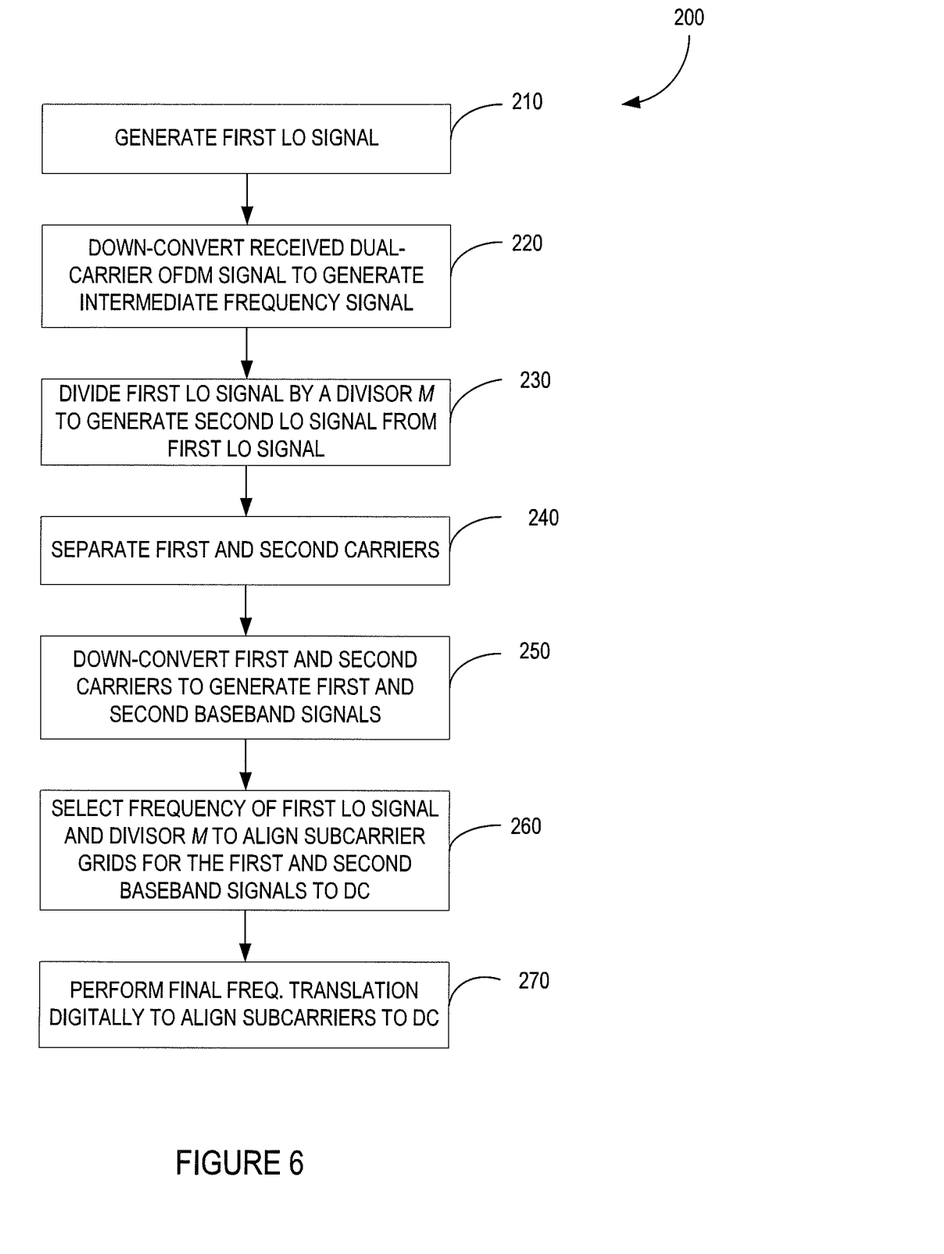
FIG. 6 illustrates an exemplary method of down-converting a dual carrier signal to baseband.

FIG. 6 illustrates an exemplary method of down-conversion implemented by the dual-carrier receiver 10. The frequency generation circuit 60 generates a first local oscillator signal RFLO (block 210) and down-converts the received dual-carrier signal to an intermediate frequency in the first down-conversion stage 20 (block 220). The frequency generation circuit 60 also generates a second local oscillator signal IFLO from the first local oscillator signal RFLO (block 230). For example, the frequency generation circuit 60 may include a frequency divider 64 that divides the first local oscillator signal RFLO by an integer M to derive the second local oscillator signal IFLO. In some embodiments, the dual-carrier receiver 10 derives a single second local oscillator signal IFLO as shown in FIGS. 2 and 3. In other embodiments, two second local oscillator signals $IFLO_{c1}$ and $IFLO_{c2}$ are generated as shown in FIG. 5. In the second down-conversion stage 40, the dual-carrier receiver 10 separates the carriers (block 240) and down-converts the carriers to a frequency near baseband to generate first and second baseband signals (block 250). The down-conversion may be performed by a single complex mixer 42 as shown in FIG. 2, or by separate complex mixers 42 as shown in FIGS. 3 and 5. To reduce the effects of the frequency translation error following down-conversion, the controller 80 select the frequency $f_{RFLO}$ of the first local oscillator signal RFLO and the divisor M so that the subcarrier grids for the first and second baseband signals align with DC (block 260). For example, in an OFDM system, the frequency $f_{RFLO}$ of the first local oscillator signal RFLO may be selected to align subcarrier grids for the first and second baseband signals with DC. It should be recognized that the baseband signals may be shifted relative to DC. Thus, at least one, possibly both, of the baseband signals may have a non-zero center frequency, i.e., a center frequency that is not aligned with DC. Accordingly, a final frequency translation may be performed in the digital domain to align the carriers with DC (block 270).

Figure 7A:
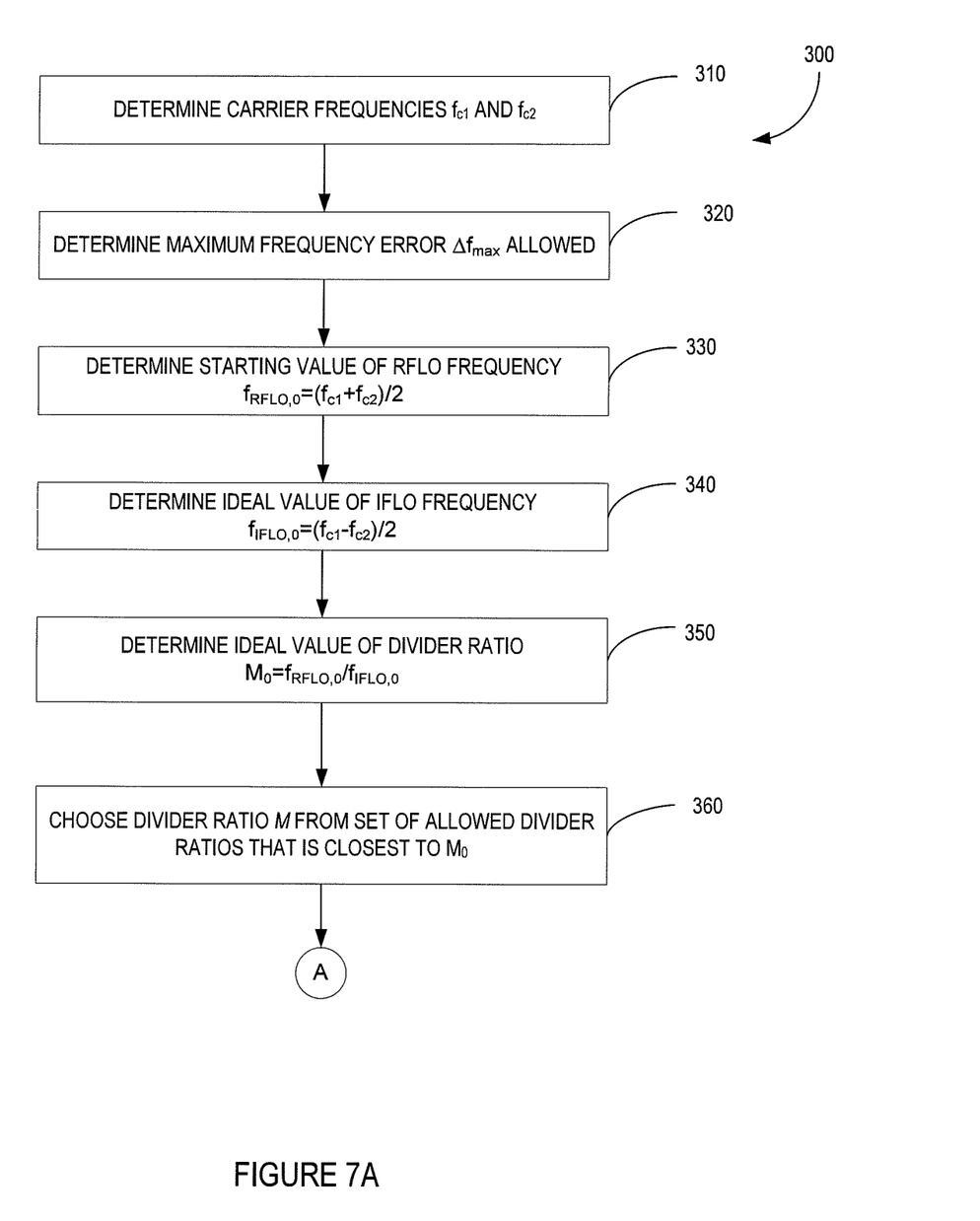
FIGS. 7A and 7B illustrate a detailed implementation of a method of down-converting a dual carrier signal to baseband.
Figure 7B:
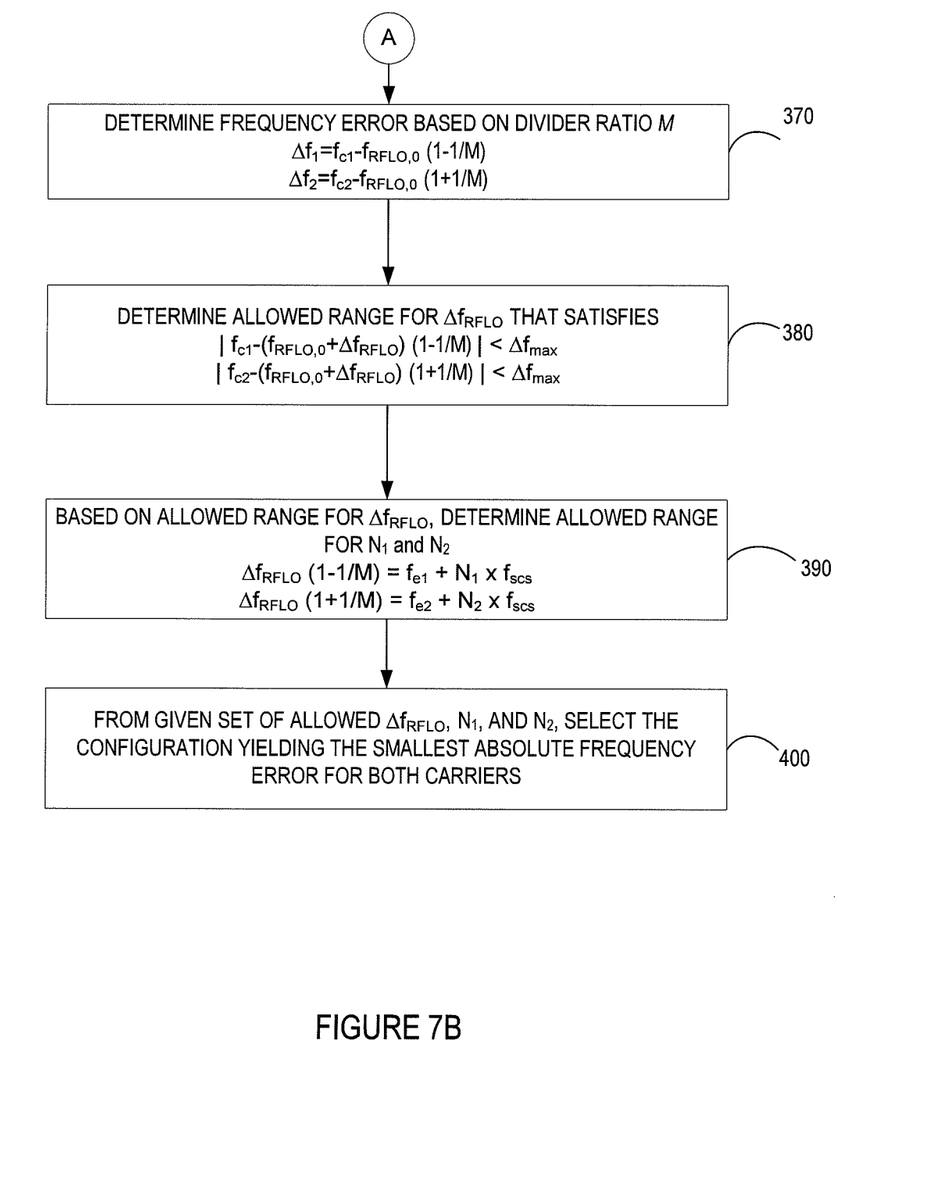

FIGS. 7A and 7B illustrate a detailed implementation of a method 300 of down-converting a dual carrier signal to baseband. The method 300 is based on establishing a maximum allowed frequency translation error $f_{MAX}$ and how this is used to determine M, $\Delta f_{RFLO}$, $N_1$ and $N_2$. According to the method 300, carrier frequencies $f_{c1}$ and $f_{c2}$ are determined (block 310), and a maximum allowed frequency translation error $f_{max}$ allowed is also determined (block 320). A starting value of $f_{RFLO}$ is determined (block 330), and an ideal value of $f_{IFLO}$ is determined (block 340), as shown below:

$$f_{RFLO,0}=(f_{c1}+f_{c2})/2 \quad (0.24)$$

$$f_{IFLO,0}=(f_{c1}-f_{c2})/2 \quad (0.25)$$

An ideal value of divider ratio (i.e. "divisor") M is determined (block 350) according to Eq. (0.26), as shown below:

$$M_0=f_{RFLO,0}/f_{IFLO,0} \quad (0.26)$$

A divider ratio M is chosen from a set of allowed divider ratios that is closest to $M_0$ (block 360). Then a frequency translation error is determined based on the divider ratio M (block 370) as shown below:

$$\Delta f_1=f_{c1}-f_{RFLO,0}(1-1/M) \quad (0.27)$$

$$\Delta f_2=f_{c2}-f_{RFLO,0}(1+1/M) \quad (0.28)$$

An allowed range for $\Delta f_{RFLO}$ is then determined (block 380) that satisfies Eq. (0.29) and (0.30) below:

$$|f_{c1}-(f_{RFLO,0}+\Delta f_{RFLO})(1-1/M)|<f_{max} \quad (0.29)$$

$$|f_{c2}-(f_{RFLO,0}+Df_{RFLO})(1+1/M)|<f_{max} \quad (0.30)$$

Based on the allowed range for $\Delta f_{RFLO}$, an allowed range for $N_1$ and $N_2$ is determined (block 390), as shown below:

$$\Delta f_{RFLO}(1-1/M)=f_{c1}\pm N_1 \times f_{scs} \quad (0.31)$$

$$\Delta f_{RFLO}(1+1/M)=f_{c2}\pm N_2 \times f_{scs} \quad (0.32)$$

From the given set of allowed $\Delta f_{RFLO}$, $N_1$, and $N_2$, a configuration is selected that yields the smallest absolute frequency translation error for both carriers (block 400).

The methods and apparatus described herein enable the reduction of components in the front-end of the receiver. The reduction in the component count results in lower space requirements, lower costs, and lower power consumption.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A dual-carrier receiver for an Orthogonal Frequency Division Multiplexing (OFDM) system comprising:
    a first down-converter configured to down-convert a received dual-carrier signal having first and second OFDM carriers to generate an intermediate frequency dual-carrier signal;
    a frequency synthesizer configured to generate a first local oscillator frequency for the first down-converter, said first local oscillator frequency being between the first and second carriers;
    a second down-converter configured to separate and down-convert said first and second carriers from the intermediate frequency dual-carrier signal to generate first and second baseband signals;
    a frequency divider coupled to said frequency synthesizer and configured to divide the first local oscillator frequency by a divisor M to generate a second local oscillator frequency for said second down-converter; and
    a controller configured to select the first local oscillator frequency and the divisor M to align subcarrier grids for said first and second baseband signals with direct current (DC);
    wherein the controller is configured to select the first local oscillator frequency by:
    determining an initial local oscillator frequency between the first and second carriers; and
    determining a frequency adjustment that when added to said initial local oscillator frequency aligns the subcarrier grids for said first and second baseband signals with DC;
    wherein the controller is configured to determine the frequency adjustment by:
    computing, as a function of a first parameter and a subcarrier spacing of the subcarrier grids, a first frequency translation to align the subcarrier grid for the first baseband signal to DC;
    computing, as a function of a second parameter and the subcarrier spacing, a second frequency translation to align the subcarrier grid for the second baseband signal to DC;
    selecting the first and second parameters to minimize a difference between actual and desired frequency translations for the first and second carriers; and
    computing the frequency adjustment as a function of one or both of the first and second parameters;
    wherein the first and second parameters comprise integer values.

2. The dual-carrier receiver of claim 1 wherein the controller is further configured to select an integer as the divisor M for the frequency divider.

3. The dual-carrier receiver of claim 2 wherein the controller is further configured to select the first local oscillator frequency to reduce the effects of frequency translation errors resulting from the division of the first local oscillator frequency by the integer divisor M.

4. The dual-carrier receiver of claim 2 wherein the controller is configured to select the first local oscillator frequency as a function of the integer divisor M.

5. The dual-carrier receiver of claim 1 wherein the controller is configured to select the first local oscillator frequency as a function of a frequency spacing of the subcarrier grids and the divisor M.

6. The dual-carrier receiver of claim 1 wherein the controller is configured to select the first local oscillator frequency and divisor M such that at least one of the first and the second baseband signals has a nonzero center frequency.

7. The dual-carrier receiver of claim 1, wherein the dual-carrier receiver is included in a wireless communications device.

8. A method of down-converting a received dual-carrier signal comprising first and second Orthogonal Frequency Division Multiplexing (OFDM) carriers to baseband, said method comprising:
- generating a first local oscillator frequency between the first and second carriers;
- down-converting the received dual-carrier signal to generate an intermediate frequency dual-carrier signal by mixing the received dual-carrier signal with the first local oscillator frequency;
- generating a second local oscillator frequency from the first local oscillator frequency by dividing the first local oscillator frequency by a divisor M;
- separating and down-converting the first and second carriers from the intermediate frequency dual-carrier signal to generate first and second baseband signals by mixing the first and second carriers with the second local oscillator frequency; and
- selecting the first local oscillator frequency and the divisor M to align subcarrier grids for said first and second baseband signals with direct current (DC);
- wherein selecting the first local oscillator frequency further comprises: determining an initial local oscillator frequency between the first and second carriers; and
- determining a frequency adjustment that when added to said initial local oscillator frequency aligns the subcarrier grids for said first and second baseband signals with DC;
- wherein determining a frequency adjustment comprises:
- computing, as a function of a first parameter and a subcarrier spacing of the subcarrier grids, a first frequency translation to align the subcarrier grid of the first baseband signal to DC;
- computing, as a function of a second parameter and the subcarrier spacing, a second frequency translation to align the subcarrier grid of the second baseband signal to DC;
- selecting the first and second parameters to minimize a difference between the actual and desired frequency translations for the first and second carriers; and computing the frequency adjustment as a function of one or both of the first and second parameters;
- wherein the first and second parameters comprise integer values.

9. The method of claim 8 wherein selecting the first local oscillator frequency and divisor M further comprises selecting an integer as the divisor M for the frequency divider.

10. The method of claim 9 wherein selecting the first local oscillator frequency and integer divisor M further comprises selecting the first local oscillator frequency to reduce the effects of frequency translation errors resulting from the division of the first local oscillator frequency by the integer divisor M.

11. The method of claim 9 wherein selecting the first local oscillator frequency and divisor M further comprises selecting the first local oscillator frequency as a function of the integer divisor M.

12. The method of claim 8 wherein selecting the first local oscillator frequency and divisor M further comprises selecting the first local oscillator frequency as a function of a subcarrier spacing of the subcarrier grids and the divisor M.

13. The method of claim 8, wherein selecting the first local oscillator frequency and the divisor M comprises selecting the first local oscillator frequency and the divisor M such that at least one of the first and the second baseband signals has a nonzero center frequency.

14. The method of claim 8, wherein the method is implemented by a wireless communication device.

* * * * *